Dec. 9, 1930.   E. W. PELSTER   1,783,977
AXLE STRUCTURE
Filed Jan. 19, 1929
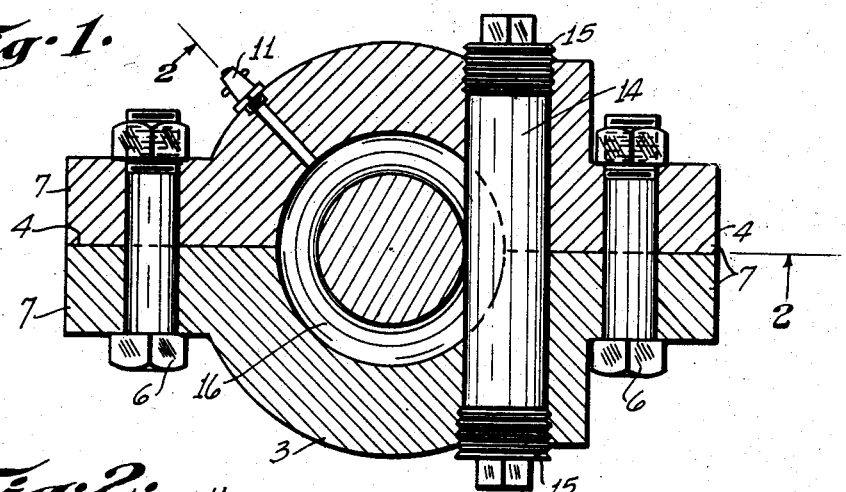
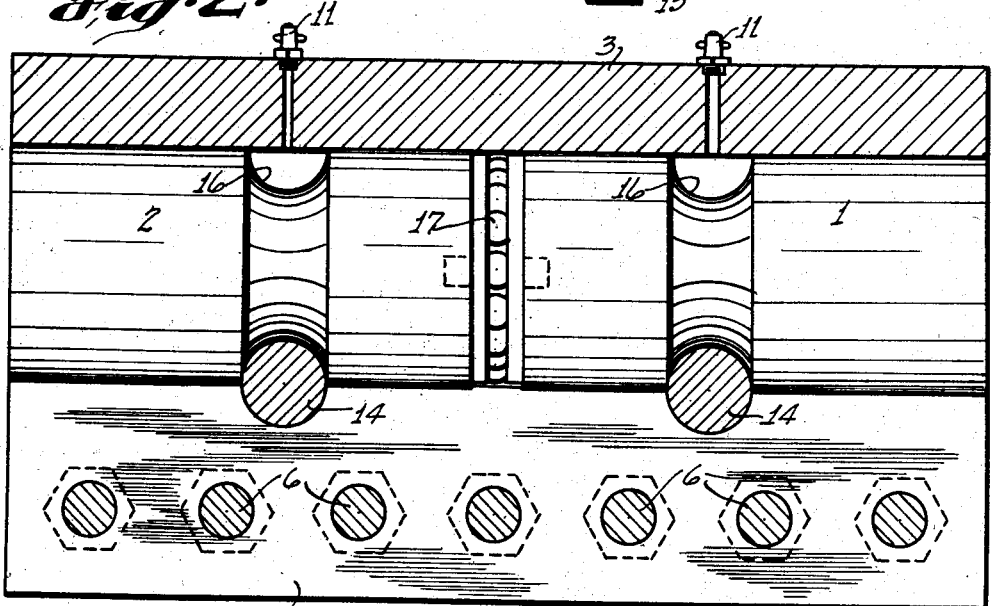
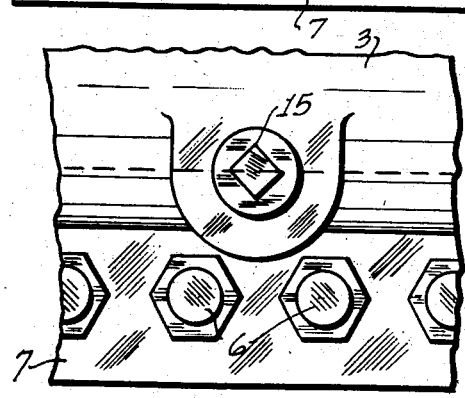
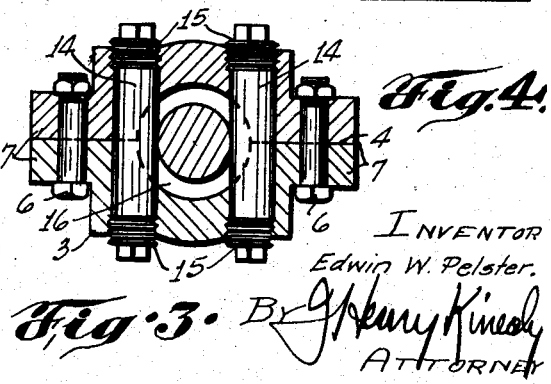
INVENTOR
Edwin W. Pelster.
By J Henry Kinealy
ATTORNEY Patented Dec. 9, 1930

1,783,977

UNITED STATES PATENT OFFICE

EDWIN W. PELSTER, OF ST. LOUIS, MISSOURI

AXLE STRUCTURE

Application filed January 19, 1929. Serial No. 333,539.

My invention relates to axle structures and more particularly to axle structures of the type used in railroad or street cars wherein for strength and ease of manufacture the wheels are fixed to the outer ends of the axle proper.

Heretofore when axles of this type were used the power required to pull a given load was comparatively great since both wheels were fixed to a solid axle and when the load was moved around a curve the wheel on the inside of the curve necessarily had to slip thereby creating a frictional resistance which could be only overcome by the application of more power than was necessary to normally pull the load on a straightaway. Also, if the wheels fixed on opposite ends of the axle were slightly different in diameter one of the wheels would have to slip a little every time it turned and this made friction which necessitated an increase in the amount of power needed to pull the load.

The object of my invention is to provide an axle structure which will obviate these and other deficiencies of structure and will, therefore, greatly reduce the power needed to draw a given load.

My invention is fully shown in the accompanying drawings wherein similar characters are used to designate similar parts:

Fig. 1 is a transverse sectional view of an axle structure embodying one form of my invention; Fig. 2 is a longitudinal sectional view taken along the lines 2—2 in Fig. 1; Fig. 3 is a detail view of the form shown in Figs. 1 and 2; and Fig. 4 shows a slight modification of the form shown in Figs. 1, 2 and 3.

My invention in its broadest sense consists of an axle structure comprising a pair of axle members positioned in longitudinal alignment and arranged to rotate about a common axis independently of one another, and also comprising a sleeve extending over the adjacent end portions of the axle members to maintain the axle members in this longitudinal alignment, and the end portions of the axle members and the inner circumferential surface of the sleeve being arranged so as to prevent the axle members from moving longitudinally out of the sleeve. To effect this latter result the sleeve carries bearing members extending inwardly from the inner circumferential surface thereof which bearing members cooperate with the outer surface of the end portions of the axle.

Referring to the figures the embodiment of my invention shown in Figs. 1 and 2 has the axle proper divided into a pair of axle members 1 and 2. A sleeve 3 is positioned over the adjacent end portions of the axle members and is adapted to maintain the axle members in longitudinal alignment. For ease of manufacture and installation I prefer that the sleeve 3 be split longitudinally as at 4 so that it is divided into sections which are maintained in fixed relation to each other by the bolts 6 passing through the longitudinally extending flanges 7, all as fully shown in the accompanying drawings.

In the form of Figs. 1, 2 and 3 the groove formed in the end portions of the axle members 1 and 2 is arcuate in shape and the bearing members 14 carried by the sleeve to cooperate with the walls of a groove 16 to prevent the axle members from moving longitudinally of the sleeve are cylindrical and are not integral with the sleeve. The bearing members are carried in holes drilled through the sleeve from top to bottom, are of less width than said holes, and are maintained in position by the screw plugs 15, or other removable means. Preferably, the bearing members 14 are free to rotate.

In the slightly modified form of Fig. 4 a pair of cylindrical bearing members 14 is provided for each of the annular grooves in the end portions of the axle members. A thrust ball bearing 17 may be provided between the adjacent ends of the axle members as shown in Fig. 2. However, this is not necessary.

If the axle structure is formed as shown in the figures the sleeve 3 will be free to rotate with the axle members 1 and 2 when said axle members are rotating together, but if, under conditions described above the wheel carried by one of the axle members must move slower than that carried by the other axle member the axle members may rotate independently of one another and at different speeds within the sleeve.

It may be readily understood that while I have shown some of the best forms in which my invention may be made I do not propose to limit myself to the exact details of construction shown in the drawings since axle structures embodying my invention may be varied within wide limits in the arrangements of the parts without deviating from the spirit of my invention as included in the claims set forth below.

What I claim as new and desire to secure by Letters Patent, is:

1. An axle structure comprising a pair of axle members in longitudinal alignment and arranged to rotate independently of one another about a common axis, a sleeve positioned over the adjacent end portions of said axle members, each of said axle members having an annular groove therein, and removable bearing members carried by said sleeve and arranged so that one of said bearing members extends in each of said grooves whereby said axle members will be prevented from moving longitudinally of said sleeve, said bearing members being free to rotate within said grooves.

2. An axle structure comprising a pair of axle members in longitudinal alignment and arranged to rotate independently of one another about a common axis, a sleeve positioned over the adjacent end portions of said axle members, each of said axle members having an annular groove therein and said sleeve having openings therein each adapted to receive a cylindrical bearing member arranged and positioned so that said bearing members will extend tangentally of said axle members and will be free to rotate within said grooves and one of said bearing members will engage the side walls of one of said grooves whereby said axle members will be prevented from moving longitudinally of said sleeve, and removable means for maintaining said bearing members in operative position.

3. An axle structure comprising a pair of axle members in longitudinal alignment and arranged to rotate independently of one another about a common axis, a sleeve positioned over the adjacent end portions of said axle members, each of said axle members having an annular groove therein, said sleeve having a tangentally disposed opening arranged to receive a bearing member positioned in line with said groove, said opening extending below the outer circumferential wall of said axle member which is engaged by said bearing member extending through said opening and into said annular groove, said opening being of a greater depth than the length of said bearing member and said bearing member being maintained in position by removable fastening means.

In witness whereof I have signed my name to the foregoing specification.

EDWIN W. PELSTER.